Nov. 12, 1929.　　　　E. A. EUSTICE　　　　1,735,567
LAWN MOWER
Filed April 15, 1927　　2 Sheets-Sheet 1
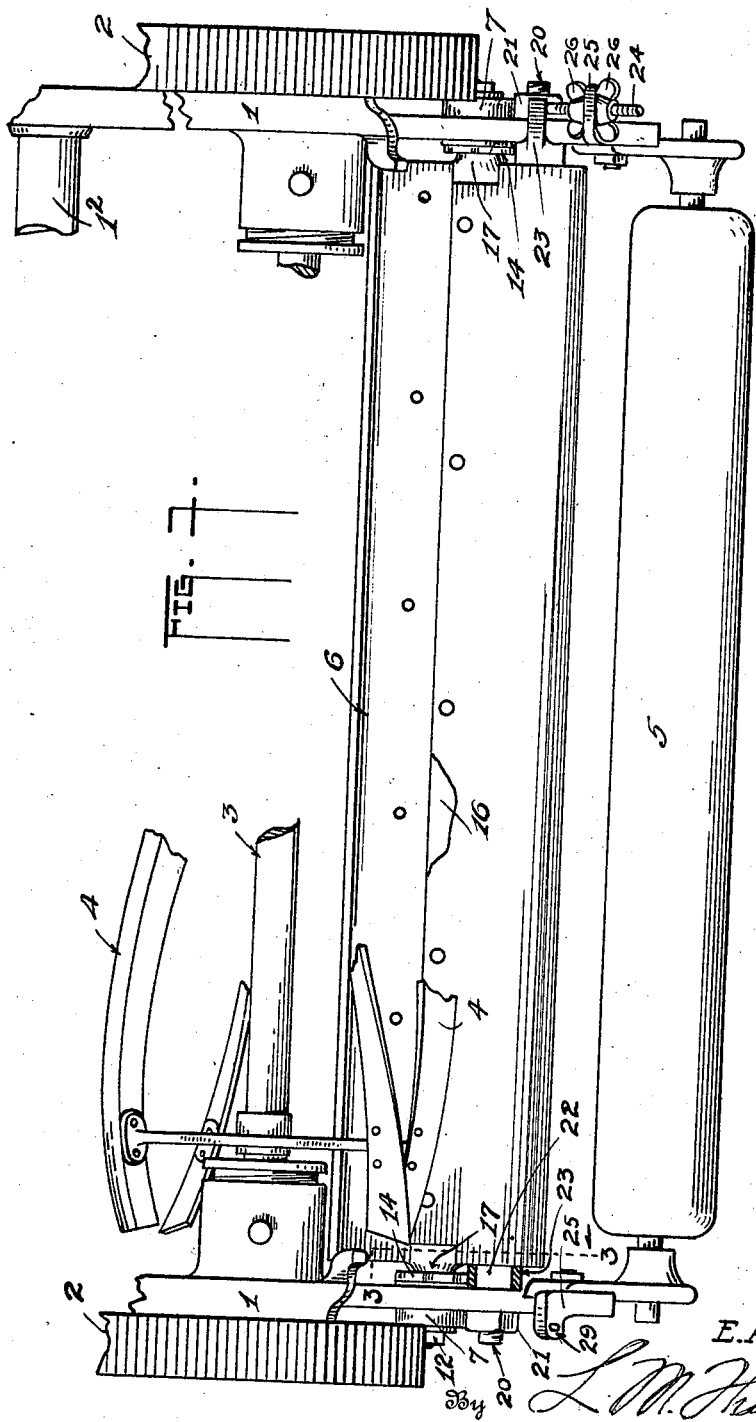
Inventor
E. A. Eustice,
By L. M. Thurlow
Attorney Nov. 12, 1929.  E. A. EUSTICE  1,735,567
LAWN MOWER
Filed April 15, 1927   2 Sheets-Sheet 2
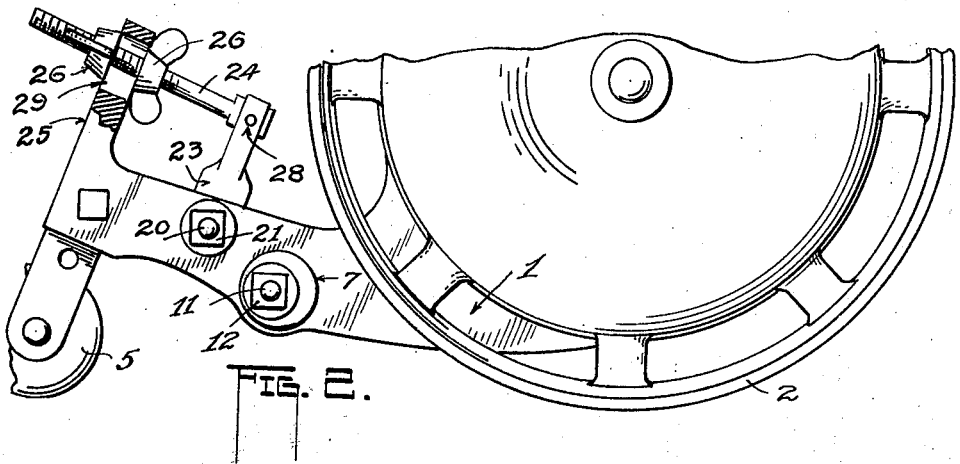
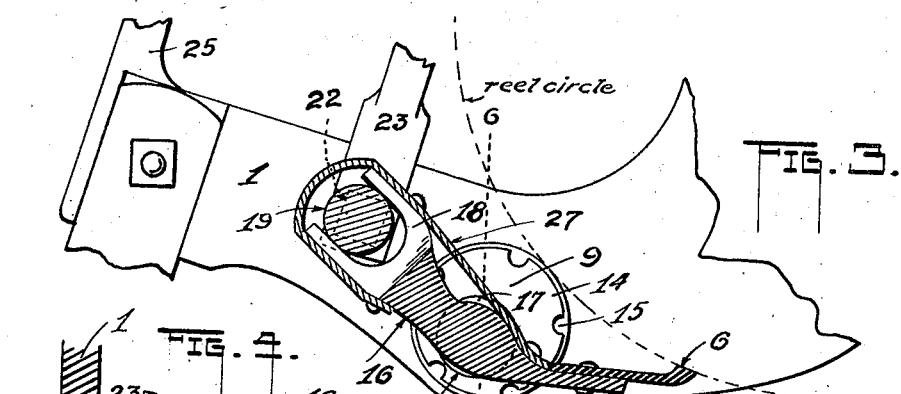
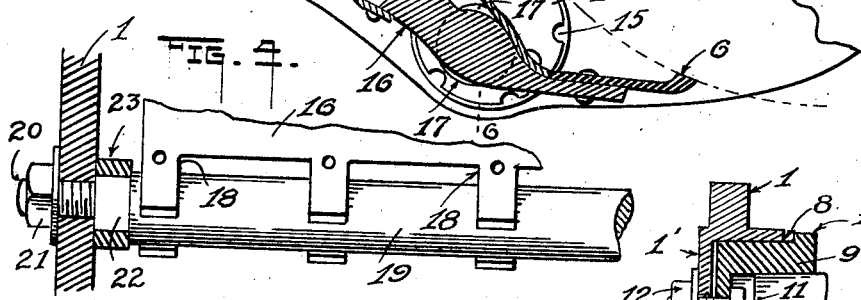
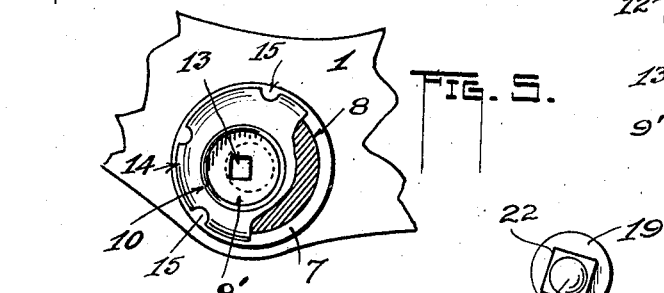
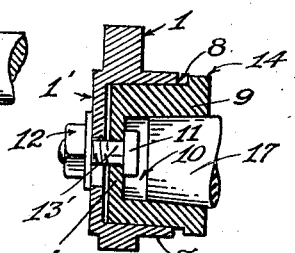
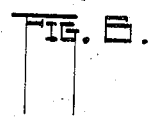
Inventor
E. A. Eustice,
By L. M. Thurlow
Attorney Patented Nov. 12, 1929

1,735,567

UNITED STATES PATENT OFFICE

EDWARD A. EUSTICE, OF GALESBURG, ILLINOIS

LAWN MOWER

Application filed April 15, 1927. Serial No. 184,103.

This invention relates to improvements in lawn mowers, having especial reference to means for adjusting the cutter-bar blades thereof.

One of the objects of the invention is to provide means for separately adjusting the ends of the cutter-bar blade of a lawn mower with respect to the reel blades.

Another object is to furnish a new means for adjusting the cutter-bar bodily with respect to the reel blades after its ends have been separately adjusted.

Still another object is that while providing means for adjusting the cutter-bar of a lawn mower such means is utilized as a brace for the entire mower frame by which to fix said frame rigidly to the end that a very staunch implement will result.

In addition to the above objects the invention includes certain details of construction and arrangement of parts providing advantages to be set forth in the following specification aided by the accompanying drawings wherein:

Figure 1 is a plan of a portion of a lawn mower with which the invention is included.

Figure 2 is a side elevation of part of a lawn mower showing parts of the invention.

Figure 3 is transverse section of the mower on a much larger scale taken on line 3—3, Figure 1, showing adjustment features for the cutter-bar.

Figure 4 is a plan of parts illustrated in Figure 3.

Figure 5 is a side elevation of part of a frame portion of the mower showing an eccentrically mounted cutter-bar adjusting member.

Figure 6 is a transverse section, in elevation, of parts shown in Figure 3 taken on line 6—6 of that figure, and Figure 7 is an end elevation of an eccentric or cam rod shown in Figures 3 and 4.

The purpose of the invention is to provide means by which accuracy of adjustment of the blade of the cutter-bar may be had in a lawn mower in that either end may be independently adjusted so that the blade may be properly placed with respect to the reel blades, and that the entire cutter-bar may be bodily tilted for the final adjustment. In addition, as pointed out earlier herein, the means by which some of the adjustments are made is utilized to assist in strengthening the frame and lending extreme rigidity thereto which is a matter of considerable importance in a lawn mower as is well known to the trade and user alike.

In the figures of the drawing 1 designates the usual end frame members of the mower, 2 the supporting and reel-driving wheels, and 3 and 4 the reel-shaft and blades respectively, while 5 is the customary roller through which the height of the cutter-bar blade designated at 6 is set.

In this instance each frame member 1 includes an extended boss 7 at its inner side, and preferably cast therewith, the same being rearward of the circle described by the reel-blades 4, Figure 3, one of the bosses being clearly shown in Figures 5 and 6. Each said boss is furnished with a socket 8 which is preferably tapered inwardly as shown, and this receives a correspondingly tapered member 9 whose inner end is spaced from the bottom of the socket 8. Said member in turn has a tapered socket 10 which, however, is eccentric to the said socket 8 as most clearly shown in Figure 5. A wall 1' is left in the frame 1 and a wall 9' is left in the member 9 by extending the sockets 8 and 10 but part way through the parts in which they are formed, and a bolt 11 extends through both these walls the head of which lies with the socket 10, while a nut 12 on said bolt outside the wall 1' serves to fix the member 9 with respect to said frame member 1, there preferably being a square hole 13 in the wall 9' to receive a squared portion 13' of the bolt. The member 9 has a flange 14 at its end which lies outside the bore 8 of the frame 1 and this is notched at intervals as at 15 for a purpose to appear.

A cutter-bar is denoted at 16, Figures 1, 3 and 4 which extends between the frame members 1, the same having at each end at substantially the middle of its width an extended tapered gudgeon 17 each adapted to seat in one of the described tapered sockets 10 of the members 9, see Figure 6. The forward edge of the cutter-bar has affixed to it in any approved manner the cutter-blade 6 previously referred to and best shown in Figure 3.

The rear edge of the cutter-bar has a series of forked extensions 18. Figures 3 and 4, and lying in said extensions is a rod 19 extending between the frame members 1. Said rod, preferably rounded, has a threaded reduced stem 20 at each end which extends through the adjacent frame member and receives a nut 21. Each said stem is eccentric to the periphery of the rod, Figure 7, and the rod is thus constituted a cam. Preferably a squared portion 22 is formed on the rod at each end inward from the said stem 20 and abuts upon the adjacent frame member, and the rod thus becomes a spacer for said frame members 1.

Each squared portion 22 receives a lever-arm 23 by which the rod may be rocked. Said arm extends upwardly, Figures 2 and 3, and to its upper end is attached one end of a rod 24 threaded at its other end and extending through a fixed arm 25 of the frame 1. On the rod 24 is a wing nut 26, for example, at each side of said arm 25 adapted to shift said rod 24 lengthwise in either direction, transmitting motion to the lever-arm 23 and the rod 19. The two wing-nuts or their equivalents serve to impart an exact adjustment and likewise provide for fixing the rod 19 positively in a desired position.

It is important that the ends of the cutter-bar blade 6 be adjusted separately for the best results and this may be done by turning the members 9 within the sockets 8 of the boss 7. By loosening the nuts 12 of the bolts 11 the members 9 may be turned by the application of a tool to the flanges 14, the notches 15 being convenient for the reception of a tool to be tapped by a hammer, for example, to slowly and accurately raise or lower the blade 6.

It is clear that since the gudgeons 17 are mounted in the members 9 eccentric to the mounting of those members the cutter bar will be raised and lowered and its blade can be adjusted to an exact degree with respect to the path of the reel blades 4.

After tightening the bolts 11, following this adjustment, the cutter-bar will remain at a fixed height but the gudgeons are free to rock within the sockets 10. Since the cutter-bar is thus free to rock on its gudgeons it may be very easily adjusted by rocking the cam rod 19 through the lever-arm 23 and associated parts.

Preferably a sheet metal shield 27 is provided to overlie the cutter-bar 16 and enclose the extensions 18 thereof for excluding from the latter grass clippings and other litter.

The rod 24 having control of the lever-arm 23 may be swiveled in the latter by means of a pivot pin 28 as in Figure 2, or the rod may be fixed to said lever and play up and down in a slot 29 in the arm 25, either method or both being open for use.

It is to be observed that since the eccentrically mounted rod 19 is shouldered against the frame members 1 the tightening of the nuts 21 thereon will secure the said frame members relatively. This in addition to and in conjunction with the usual and well known spacing bar or rod $1^2$, Figure 1, extending between said members serves to preserve a very rigid structure throughout so that no "racking" of the mower frame is permitted. This feature constitutes an important part of the invention.

The arrangement illustrated and described is a preferred construction though it is to be understood that changes may be made that will be considered as lying within the scope of the appended claims.

I claim:

1. In a lawn mower, the combination with the side frame members thereof and a cutter-bar pivotally supported between them on an axis paralleling its length, of an eccentrically mounted member on each frame member each directly carrying one end of the said cutter-bar for imparting independent orbital movement to the cutter-bar ends.

2. In a lawn mower, the combination with the frame thereof, a reel, and a cutter-bar pivotally supported between the parts of said frame on an axis lying between its longitudinal edges, of an eccentric mounted on the frame directly engaging the cutter-bar at one side of its axis, said eccentric engaging the same at both ends for adjusting its cutting edge with respect to said reel.

3. In a lawn mower, the combination with the side frame members thereof, its reel, a cutter-bar, and means mounted on each frame member for carrying one end of said cutter-bar, and for imparting an orbital movement to the latter, and an eccentrically mounted member carried by the frame members directly engaging the cutter-bar at both its ends for adjusting the cutting edge of said bar with respect to the said reel.

4. In a lawn mower, the combination with the side frame members thereof, its reel, a cutter-bar, and means mounted on each frame member for carrying one end of said cutter-bar, each for imparting an orbital movement to the latter, an eccentrically mounted member carried by the frame members directly engaging the cutter-bar at both its ends for adjusting the cutting edge of said bar with respect to the said reel, an arm fixed with respect to the said eccentrically mounted member, a threaded rod attached to the arm and extending through a part of the mower frame, and a nut on the rod at each side of the frame engaging the same adapted for adjusting said rod and for fixing the same with respect to said frame.

5. In a lawn mower, the combination with the side frame members thereof, its reel, a cutter-bar including a forked rear edge, and having tapered extensions at its ends, a member on each frame member having a tapered socket to receive said extremities, each said member being mounted whereby in a rotative movement thereof the cutter-bar extremity carried by it will be moved in an orbital path, and an eccentric rod rotatably mounted in the frame members engaging between the forked edge of the cutter-bar for tilting the latter in the socketed members.

6. A lawn mower including in combination with the side frame members thereof, a cutter-bar having tapered extremities, a member at each end of the cutter-bar having a socket to receive an extremity, each frame member having a socket to receive one of said socketed members, the socket of each of the latter being eccentric to the socket of the frame, and means to fix said socketed members with respect to the said frame members.

7. A lawn mower including in combination with the side frame members thereof, a cutter-bar therebetween adapted to tilt on an axis lying between its edges, one of said edges being forked, a rod eccentrically mounted on the frame members and engaging in the fork of the cutter-bar, and means to rock the rod and fix it with respect to said frame members.

8. In a lawn mower the combination with the mower frame and a cutter bar, of members mounted on said frame in which the cutter bar is pivotally carried at both its ends, said members being arranged to impart an orbital movement to both said ends independently, and mechanism to tilt the cutter bar with respect to the members and for fixing it in a desired position.

In testimony whereof I affix my signature.

EDWARD A. EUSTICE.